Sept. 6, 1938.  E. M. EVANS  2,129,413
POWER GENERATING APPARATUS
Filed Dec. 7, 1936  4 Sheets-Sheet 1
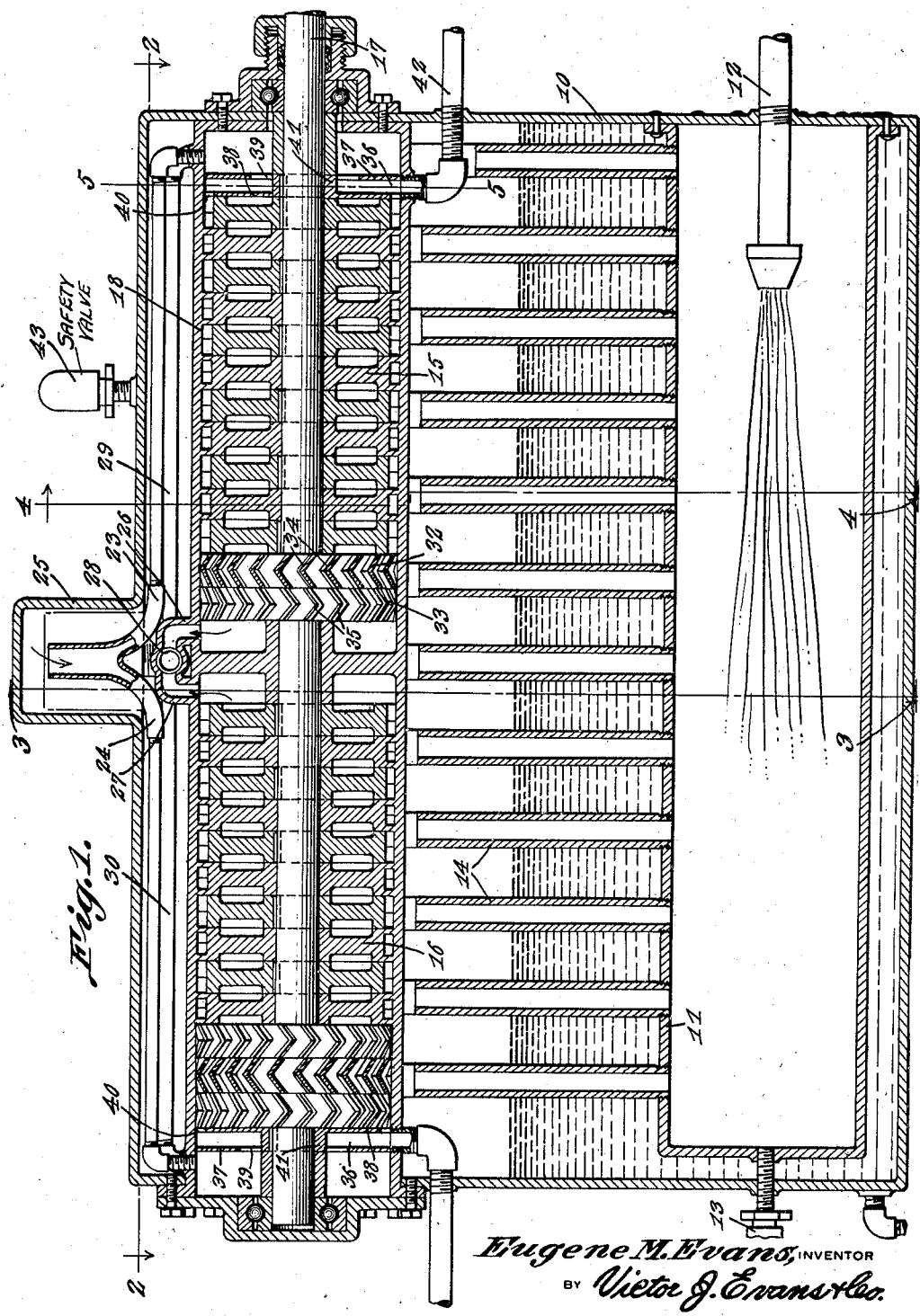
Eugene M. Evans, INVENTOR
BY Victor J. Evans & Co.
ATTORNEYS Sept. 6, 1938.　　　　E. M. EVANS　　　　2,129,413
POWER GENERATING APPARATUS
Filed Dec. 7, 1936　　　4 Sheets-Sheet 2
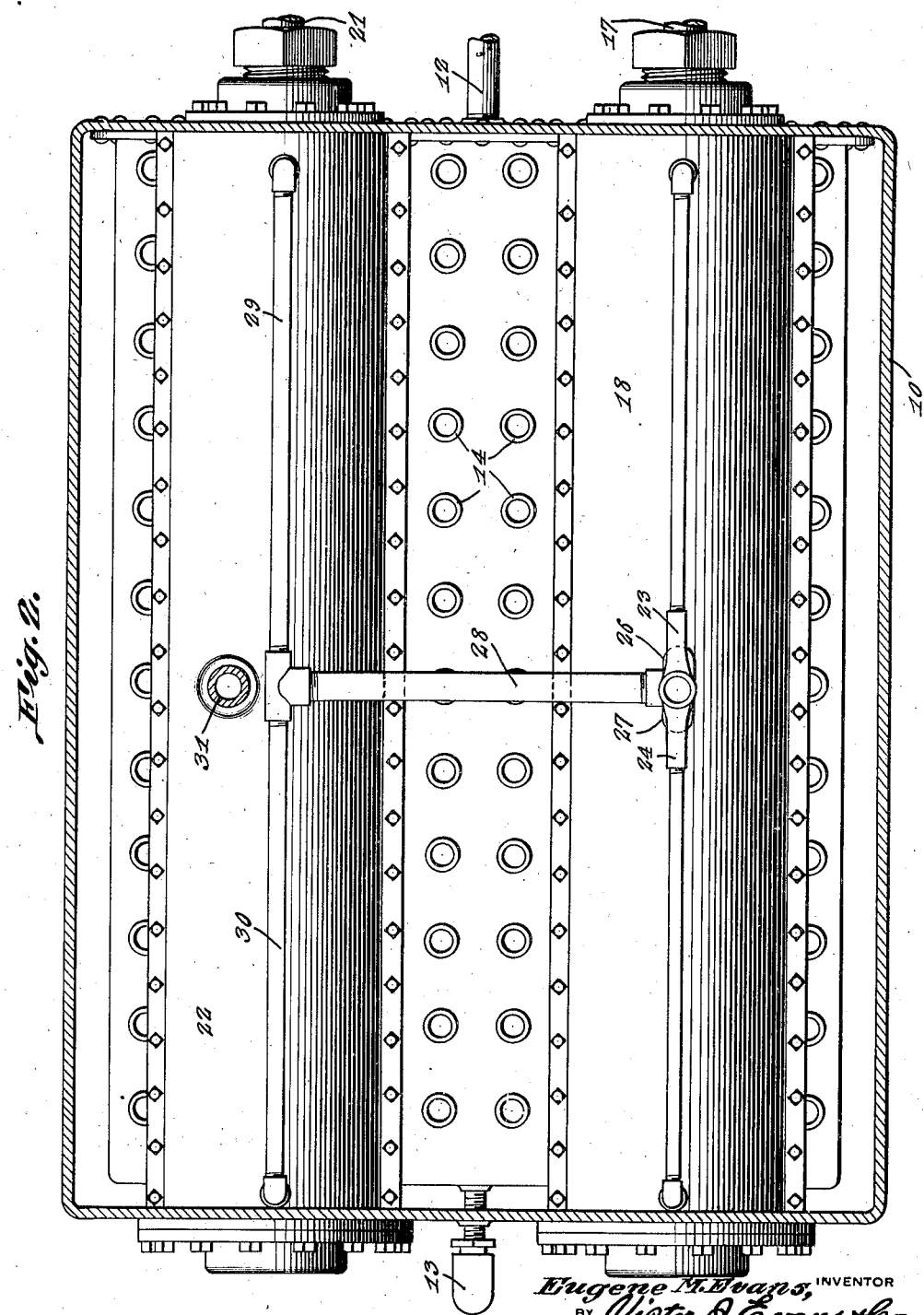

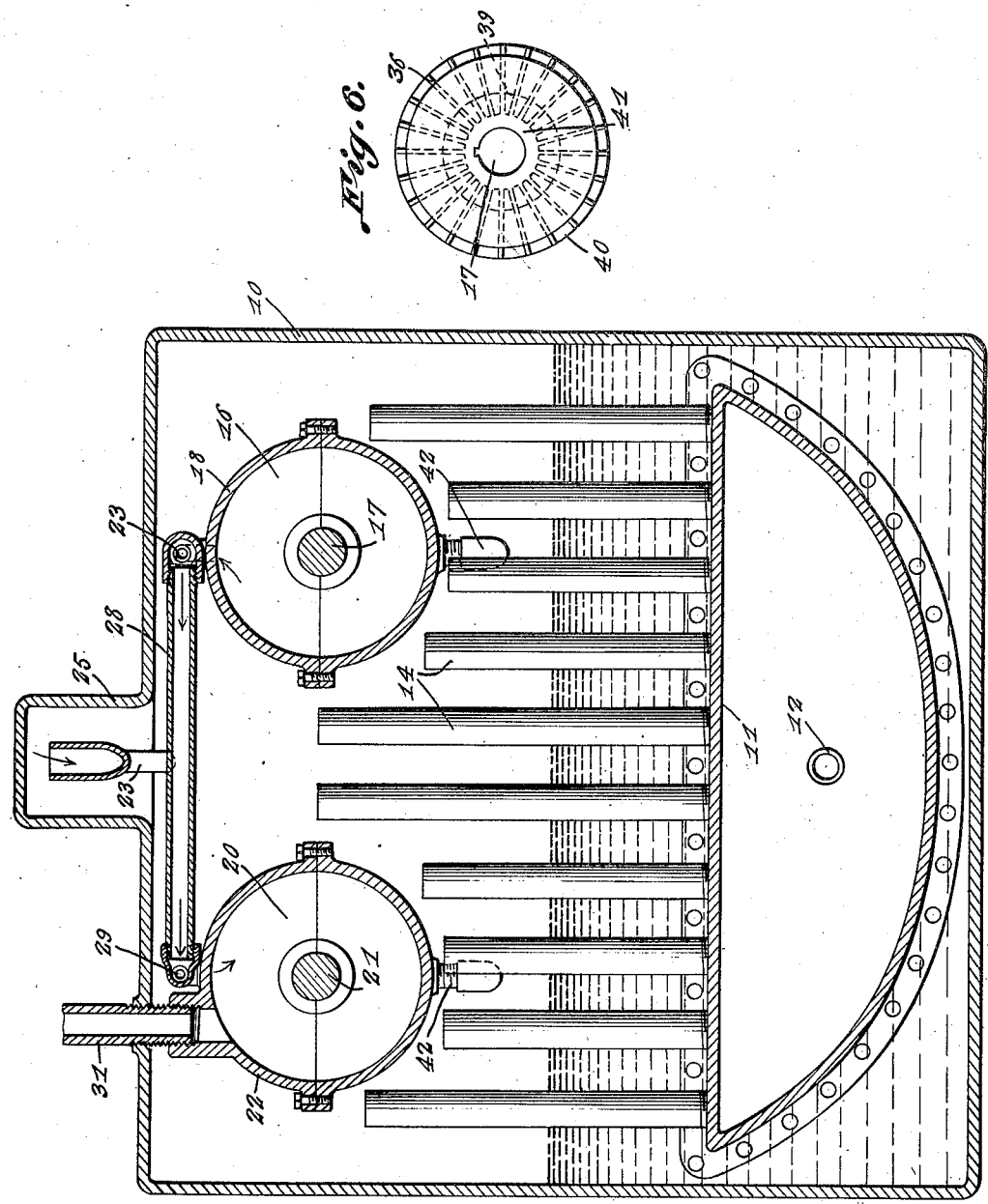

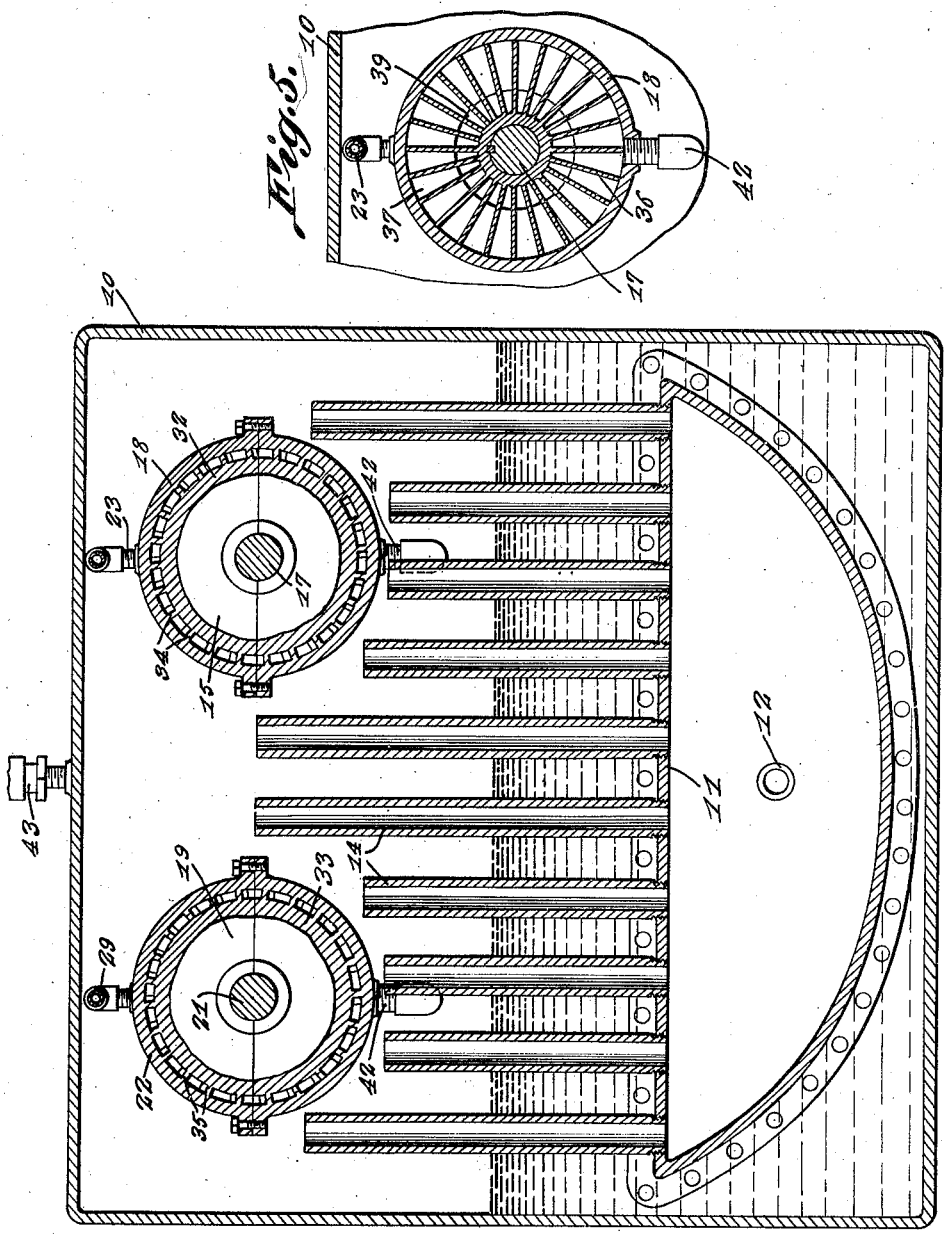

Patented Sept. 6, 1938

2,129,413

UNITED STATES PATENT OFFICE 2,129,413

POWER GENERATING APPARATUS

Eugene M. Evans, Jefferson City, Mo., assignor of one-tenth to Ernest J. Tietjen, Jefferson City, Mo.

Application December 7, 1936, Serial No. 114,707

2 Claims. (Cl. 60—42)

This invention relates to power generating apparatus and has for an object to provide apparatus comprising a boiler shell having a combustion chamber extending approximately the full length of the shell and heat transfer tubes extending upwardly from the upper side of the combustion chamber, there being turbine type engines arranged within the boiler shell above the water line of the shell and connected in series, the steam pipes extending from the steam dome of the boiler shell to the intakes of one set of engines and the exhaust outlets of this set of engines being connected to the intakes of another set of engines from which last engines the exhaust is conveyed outside of the boiler shell and may be again used for energizing an additional engine if desired.

A further object of the invention is to provide apparatus of this type in which heat transfer tubes are open at their upper ends to permit the products of combustion to escape therefrom into the boiler shell, a portion of the products of combustion being directed against the casings of the engines and all of the products of combustion being mixed with the steam in the steam dome to the end that the energy of the combustion is used first to heat water to make steam and that energy which is not absorbed by the water in creating steam is further used by mixing with the steam, under equal pressure, before going to the engines so that a higher percentage of power is derived by the heat of combustion than by other known methods at the present time.

A further object of the invention is to provide apparatus of this type embodying a rotary fan type separator at each intake of the engines to convey foreign substance such as carbon, soot, or condensate past the intake of the engine and to the bottom of the separator where provision is made for its reception and exhaust.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a longitudinal sectional view of power generating apparatus constructed in accordance with the invention.

Figure 2 is a longitudinal sectional view taken on the line 2—2 of Figure 1 showing the sets of turbine type engines in plan and connected in series.

Figure 3 is a cross sectional view taken on the line 3—3 of Figure 1 showing the relative location of the combustion chamber, heat transfer tubes, turbine type engines and water space in the boiler shell.

Figure 4 is a cross sectional view similar to Figure 3 and taken on the line 4—4 of Figure 1 to show more clearly the stator and rotor construction of each engine.

Figure 5 is a detail cross sectional view taken on the line 5—5 of Figure 1 showing the separator fan of one of the engines.

Figure 6 is a detail cross sectional view similar to Figure 5 but showing the partition and port therein adjacent the initial stator through which port the steam and products of combustion will be urged past the intake port of the initial stator.

Referring now to the drawings in which like characters of reference designate similar parts in the various views, 10 designates a boiler shell within the bottom of which is located a combustion chamber 11 which extends substantially the entire length of the lower portion of the boiler shell and is submerged completely below the water level. A fuel nozzle connection 12 opens through one end wall of the combustion chamber, for attachment of any suitable high pressure oil burner. A safety valve 13 is connected with the opposite end of the combustion chamber.

A plurality of heat transfer tubes 14 extend upwardly from the upper side of the combustion chamber, through the water, and end above the water line, these tubes being arranged in such manner that excess heat, not absorbed by the water, and the gases of combustion are forced against the outer shells of turbine type engines, thereby adding heat to the engines in order to maintain a constant temperature. Hot gases of combustion, mix with the steam generated to energize the internally disposed turbine type engines.

As best shown in Figures 2 and 3 a pair of aligned turbine type engines 15 and 16 are mounted on a common shaft 17 and in a common casing 18. A similar pair of turbine type engines 19 and 20 are mounted in the boiler shell on a common shaft 21 and are housed by a common casing 22. Steam pipes 23 and 24 extend from the steam dome 25 of the boiler shell to the intake ends of respective engines 15 and 16, as best shown in Figure 1. Steam pipes 26 and 27 extend from the exhausts of these engines and are connected, as best shown in Figure 2, to a steam pipe 28 which is connected to steam pipes 29 and 30 which enter the intake ends of the second pair of engines 19 and 20. Thus the engines are connected in series parallel so that the exhaust from one set is used as a steam supply for the engines of the other set. An exhaust pipe 31 leads from the second set of engines to the exterior of the boiler shell.

Each turbine type engine embodies a plurality of alternate stators 32 and rotors 33, best shown in Figure 1, the stators and rotors being equipped with the conventional V-shaped vanes 34 and 35 which deflect the steam at an angle from one stator against the vanes of the next adjacent rotor so that rotation is imparted to the latter in the conventional manner.

For separating foreign substances such as carbon, soot or condensate from the steam and gaseous products of combustion a fan 36, best shown in Figures 5 and 6, is keyed to each engine shaft at the intake end of each engine and is separated from the initial stator of each engine by partitions 37 and 38, best shown in Figure 1. The partition 37 is provided with a port 39 adjacent the shaft of the engine, while the partition 38 next adjacent to the initial stator is provided with a port 40 at the periphery thereof so that the incoming steam and gaseous products of combustion will be picked up by the fan near the hub 41 thereof and thrown out by centrifugal force past the annular intake port 40 of the initial stator and will finally collect at the bottom of the engine casing and may be drawn off periodically or continuously through a draw off pipe 42.

A relief valve 43 is mounted in the top of the boiler shell for relieving excess pressure from the boiler.

From the foregoing description it will be seen that in the apparatus comprising the subject matter of this invention the energy of the products of combustion and the energy of the steam generated by the heat of combustion are combined under equal pressure as a common gaseous vapor. Also that this common gaseous vapor is used as a medium for energizing engines of the turbine type connected in series and heated by virtue of the discharge of the products of combustion together with the steam in the boiler, against the casings of the engines and that heat dissipation, usually found in conventional power generating apparatus, is reduced to an absolute minimum.

Furthermore, the multiple flues or heat transfer tubes carry the hot gases from the combustion chamber through the water in the boiler in such a way that the heat is quickly transferred to the water surrounding the tubes and the combustion chamber.

From the above description it is thought that the construction and operation of the invention will be fully understood without further explanation.

What is claimed is:

1. Power generating apparatus including a horizontally disposed boiler shell, a combustion chamber extending substantially the full length of the bottom of the shell, a plurality of horizontally disposed turbine type engines within the steam space of the shell and subjected to steam throughout their entire exteriors, heat transfer tubes extending vertically upward from the combustion chamber into the steam space and directing hot gaseous products of combustion against the engines and into the steam space, a steam dome on the shell for collecting and mixing the products of combustion and steam, and steam pipes extending from the steam dome and connecting the engines together in series parallel.

2. Power generating apparatus including a horizontally disposed boiler shell, a combustion chamber extending substantially the full length of the bottom of the shell, a plurality of horizontally disposed turbine type engines within the steam space of the shell and subjected to steam throughout their entire exteriors, heat transfer tubes extending vertically upward from the combustion chamber into the steam space and directing hot gaseous products of combustion against the engines and into the steam space, a steam dome on the shell for collecting and mixing the products of combustion and steam, steam pipes extending from the steam dome and connecting the engines together in series parallel, a collection chamber for foreign matter in the boiler at the intake end of one of the engines, and a fan in said chamber driven by the last named engine for separating foreign matter from the products of combustion and steam and depositing the foreign matter into the collection chamber for subsequent removal.

EUGENE M. EVANS.